(12) United States Patent
Kruckemyer et al.

(10) Patent No.: US 9,213,643 B2
(45) Date of Patent: Dec. 15, 2015

(54) BROADCAST MESSAGING AND ACKNOWLEDGMENT MESSAGING FOR POWER MANAGEMENT IN A MULTIPROCESSOR SYSTEM

(71) Applicants: David Alan Kruckemyer, San Jose, CA (US); John Gregory Favor, Scotts Valley, CA (US)

(72) Inventors: David Alan Kruckemyer, San Jose, CA (US); John Gregory Favor, Scotts Valley, CA (US)

(73) Assignee: Applied Micro Circuits Corporation, Santa Clara, CA (US)

( * ) Notice: Subject to any disclaimer, the term of this patent is extended or adjusted under 35 U.S.C. 154(b) by 293 days.

(21) Appl. No.: 13/799,268

(22) Filed: Mar. 13, 2013

(65) Prior Publication Data

US 2014/0281275 A1    Sep. 18, 2014

(51) Int. Cl.
| G06F 13/00 | (2006.01) |
| G06F 13/28 | (2006.01) |
| G06F 12/08 | (2006.01) |
| G06F 1/32 | (2006.01) |

(52) U.S. Cl.
CPC .......... *G06F 12/0833* (2013.01); *G06F 1/3243* (2013.01); *G06F 2212/1028* (2013.01)

(58) Field of Classification Search
CPC .............. G06F 1/3243; G06F 12/0833; G06F 2212/1028
See application file for complete search history.

(56) References Cited

U.S. PATENT DOCUMENTS

| 6,085,330 | A * | 7/2000 | Hewitt et al. ................ 713/322 |
| 6,993,632 | B2 | 1/2006 | Kruckemyer et al. |
| 7,366,847 | B2 | 4/2008 | Kruckemyer et al. |
| 7,453,878 | B1 | 11/2008 | Martin et al. |
| 7,506,108 | B2 | 3/2009 | Beers et al. |
| 7,543,115 | B1 | 6/2009 | Batson et al. |
| 7,627,721 | B2 | 12/2009 | Hass |
| 7,721,050 | B2 | 5/2010 | Hum et al. |
| 7,991,977 | B2 | 8/2011 | Hass et al. |
| 8,111,615 | B2 | 2/2012 | Chang |
| 8,176,298 | B2 | 5/2012 | Hass |
| 8,250,311 | B2 | 8/2012 | Beers et al. |
| 2005/0273633 | A1 * | 12/2005 | Wilcox et al. ................ 713/300 |
| 2008/0005596 | A1 * | 1/2008 | Sistla et al. ................ 713/300 |
| 2009/0138220 | A1 * | 5/2009 | Bell et al. ................ 702/60 |
| 2011/0153924 | A1 * | 6/2011 | Vash et al. ................ 711/105 |
| 2012/0110270 | A1 * | 5/2012 | Moyer ................ 711/146 |

* cited by examiner

*Primary Examiner* — Edward Dudek, Jr.
(74) *Attorney, Agent, or Firm* — Amin, Turocy & Watson, LLP

(57) ABSTRACT

Various aspects provide for implementing a cache coherence protocol. A system comprises at least one processing component and a centralized controller. The at least one processing component comprises a cache controller. The cache controller is configured to manage a cache memory associated with a processor. The centralized controller is configured to communicate with the cache controller based on a power state of the processor.

19 Claims, 14 Drawing Sheets

BROADCAST MESSAGING AND ACKNOWLEDGMENT MESSAGING FOR POWER MANAGEMENT IN A MULTIPROCESSOR SYSTEM

TECHNICAL FIELD

The subject disclosure relates generally to cache coherence protocols, and more particularly to broadcast messaging and acknowledgment messaging for power management in a multiprocessor system.

BACKGROUND

A cache coherence protocol can be implemented in a multiprocessor system. For example, a multiprocessor system can include a plurality of processors (e.g., a plurality of cores), a plurality of controllers and a plurality of cache memories. Each of the plurality of processors can be associated with a controller that manages content in a cache memory. For example, a controller can manage a cache memory so that the cache memory includes a most recent copy of data (e.g., a copy of data that matches data in a main memory of the multiprocessor system). The cache coherence protocol can include a snooping mechanism. For example, snoop messages can be sent between the plurality of controllers in the multiprocessor system to achieve cache coherency. Furthermore, the plurality of processors can be enabled and disabled based on power requirements and/or performance requirements of the multiprocessor system. Accordingly, the multiprocessor system can be dynamically scaled based on power requirements and/or performance requirements of the multiprocessor system.

However, in a snoop-based multiprocessor system, dynamic scaling can make cache coherence difficult since the number of coherent (e.g., enabled) controllers changes over time. Furthermore, dynamic scaling can make cache coherence difficult since the number of snoop messages and/or the number of acknowledgment messages required for implementing a cache coherence snooping protocol changes over time. Therefore, snoop messages are often broadcast to all controllers in a multiprocessor system. As such, at least a portion of a controller is required to be powered-up at all times in order to respond to the snoop messages.

The above-described description is merely intended to provide a contextual overview of current multiprocessor systems and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In an example embodiment, a system comprises at least one processing component and a centralized controller. The at least one processing component comprises a cache controller. The cache controller is configured to manage a cache memory associated with a processor. The centralized controller is configured to communicate with the cache controller based on a power state of the processor.

In another example embodiment, a method comprises determining a power state for a processor and communicating with a controller associated with the processor based on the power state of the processor.

In yet another example embodiment, a system includes a means for determining a power state for a processor. The system also includes a means for communicating with a controller associated with the processor based on the power state of the processor.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION

Figure 1:
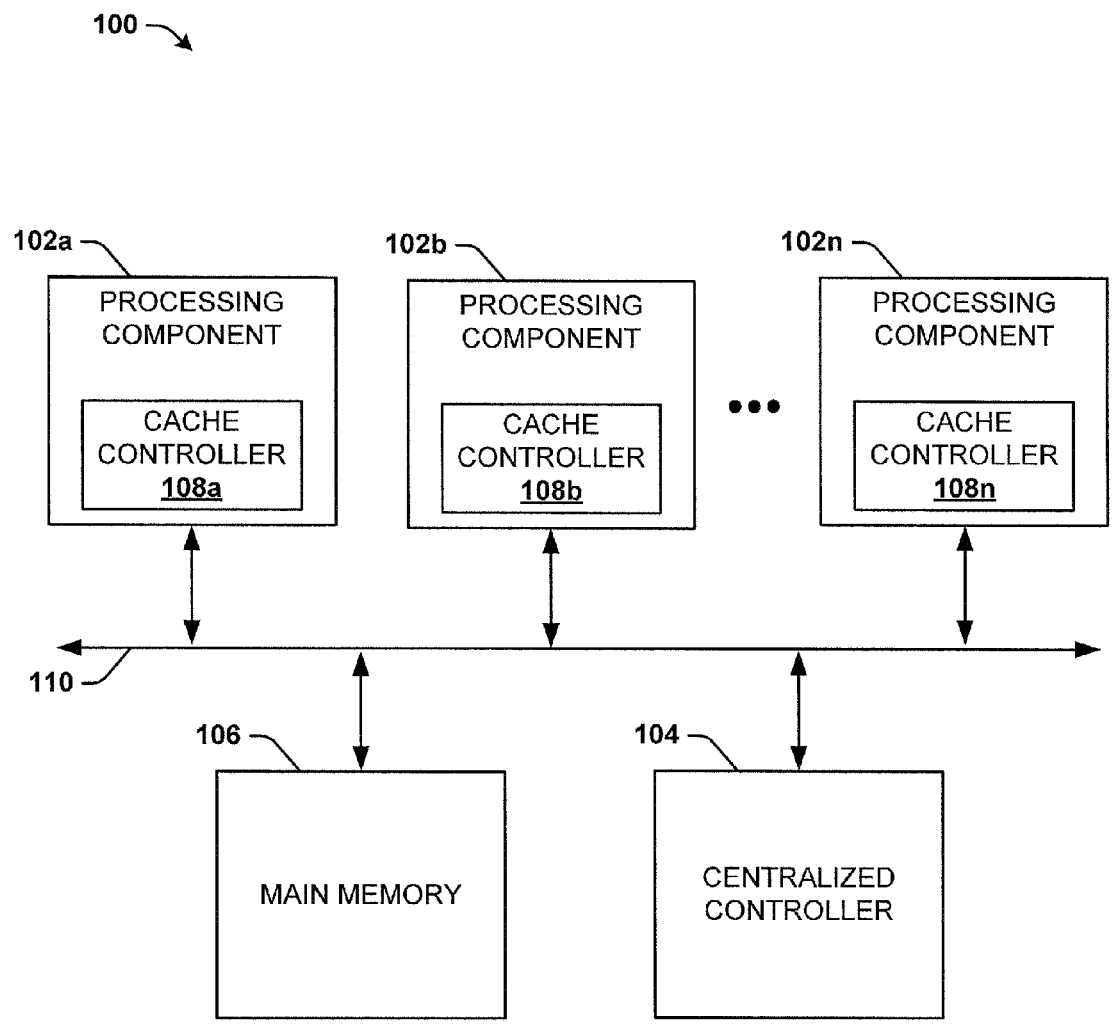
FIG. 1 is a block diagram illustrating an example, non-limiting embodiment of a multiprocessor system in accordance with various aspects described herein.

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

Various aspects of the present disclosure provide broadcast messaging and acknowledgment messaging for power management in a multiprocessor system. For example, power management can be provided for snoop broadcasting and/or acknowledgment gathering in a snoop-based cache coherence protocol. A centralized agent (e.g., a centralized controller) can comprise power state information regarding one or more agents (e.g., one or more processing agents) in the system. The centralized agent can broadcast a snoop message to an agent and/or gather an acknowledgment message from an agent based on a power state of the agent (e.g., whether the agent is in a powered-on state or in a powered-off state). As such, power-gating of an agent can be enabled without requiring snoop processing logic of the agent (e.g., at least a portion of the snoop processing logic of the agent) to be enabled. Therefore, snoop messages broadcast to an agent in a powered-off state can be prevented. Accordingly, the number of snoop messages and/or the number of acknowledgment messages in a multiprocessor system can be reduced. Furthermore, power consumption in a multiprocessor system can be reduced.

Turning now to FIG. 1, a block diagram illustrating an example, non-limiting embodiment of a multiprocessor system in accordance with various aspects described herein is shown. System 100 includes one or more processing components (processing agents) 102a-n, a centralized controller (centralized agent) 104 and a main memory 106. In one example, the centralized controller 104 can be implemented as a central broadcast mechanism. The system 100 can also include one or more cache controllers 108a-n. Each of the one or more processing components 102a-n can include a cache controller. For example, the processing component 102a can include the cache controller 108a, the processing component 102b can include the cache controller 108b, etc. In one example, the one or more processing components 102a-n can be implemented as cores (e.g., cores in a multi-core processor).

The one or more processing components 102a-n (e.g., the cache controllers 108a-n), the centralized controller 104 and the main memory 106 can be coupled to a bus 110. As such, the centralized controller 104 can communicate with the one or more processing components 102a-n (e.g., the cache controllers 108a-n) via the bus 110. For example, one or more snoop messages and/or one or more acknowledgment messages can be sent over the bus 110. Additionally, one or more messages associated with power state information (e.g., one or more power state messages) for the one or more processing components 102a-n can be sent over the bus 110.

The centralized controller 104 can be configured to communicate with the processing components 102a-n (e.g., the cache controllers 108a-n) based on a power state of the one or more processing components 102a-n. For example, the centralized controller 104 can be configured to send a snoop message to the cache controllers 108a-n and/or receive an acknowledgment message from the cache controllers 108a-n based on a power state of a respective processing component 102a-n. The centralized controller 104 can be configured to determine a power state for each processing component 102a-n. For example, the centralized controller 104 can comprise control logic (e.g., power state logic) to determine a power state for each processing component 102a-n. Additionally, the centralized controller 104 can be configured to store a power state for each of the one or more processing component 102a-n. As such, the centralized controller 104 can associate each of the one or more processing component 102a-n with a unique power domain. As such, the centralized controller 104 can filter snoop messages and/or acknowledgment messages based on the power state of the one or more processing components 102a-n. Therefore, the number of snoop messages and/or the number of acknowledgment messages in the system 100 can be reduced. In one example, the centralized controller 104 and the one or more processing components 102a-n can be arranged in a star topology (e.g., a star network). However, it is to be appreciated that the centralized controller 104 and the one or more processing components 102a-n can be arranged in a different type of network topology.

The system 100 can implement a shared memory protocol (e.g., a cache coherence protocol). In one example, the system 100 can implement a snooping cache coherence protocol. In another example, the system 100 can implement a directory-based cache coherence protocol. As such, a copy of data stored in the main memory 106 can be stored in the one or more processing components 102a-n (e.g., a cache memory in each of the one or more processing component 102a-n). Therefore, when data is updated in the main memory 106, the copies of the data stored in the one or more processing components 102a-n (e.g., the cache memory in each of the one or more processing component 102a-n) can also be updated. As such, cache coherency can be achieved.

The one or more processing component 102a-n can each additionally include a processor and/or a cache memory. For example, each cache controller 108a-n can be configured to manage a cache memory (e.g., data in a cache memory) associated with a processor for a respective processing component 102a-n. As such, the cache controller 108a can manage a cache memory and/or a processor included in the processing component 102a, the cache controller 108b can manage a cache memory and/or a processor included in the processing component 102b, etc. The one or more cache controllers 108a-n can be configured to receive one or more snoop messages from the centralized controller 104. Additionally, the one or more cache controllers 108a-n can be configured to send one or more acknowledgment messages to the centralized controller 104.

The centralized controller 104 can send one or more snoop messages to the one or more cache controllers 108a-n and/or receive one or more acknowledgment messages from the one or more cache controllers 108a-n via a broadcast mechanism. In one example, the broadcast mechanism can be the bus 110. However, it is to be appreciated that other types of broadcast mechanisms can be implemented. For example, the centralized controller 104 can send one or more snoop messages to the one or more cache controllers 108a-n and/or receive one or more acknowledgment messages from the one or more cache controllers 108a-n via point-to-point messages.

In one example, one or more snoop messages and/or one or more acknowledgment messages can be combined using circuit techniques (e.g., one or more wired logic connections). For example, one or more snoop messages and/or one or more acknowledgment messages can be combined using wired-OR logic and/or wired-AND logic (e.g., one or more logic gates). In one example, the centralized controller 104 can send individual snoop messages to the one or more cache controllers 108a-n and/or receive individual acknowledgment messages from the one or more cache controllers 108a-n. In another example, the centralized controlled can accumulate (e.g., combine) one or more snoop messages to send one or more combined snoop messages to the one or more cache controllers 108a-n. Additionally or alternatively, the centralized controlled can receive one or more combined acknowledgment messages from the one or more cache controllers 108a-n. As such, the one or more cache controllers 108a-n can manage one or more cache memories so that a most recent copy of data is stored in the one or more cache memories (e.g., a copy of data that matches data in the main memory 106 is stored in the one or more cache memories).

The centralized controller 104 can be configured to send a snoop message to a cache controller (e.g., a cache controller 108a-n) in response to a determination that a corresponding processing component (e.g., processing component 102a-n) is in a powered-up state (e.g., a powered-on state). The cache controller (e.g., a cache controller 108a-n) can be configured to send an acknowledgment message to the centralized controller in response to receiving the snoop message. Furthermore, the centralized controller 104 can be configured to enter a wait state for the acknowledgment message in response to sending the snoop message.

In one non-limiting example, the centralized controller 104 can determine that the processing component 102a is in a powered-up state. As such, the centralized controller 104 can send a snoop message to the cache controller 108a. Furthermore, the centralized controller 104 can expect a response from the cache controller 108a (e.g., an acknowledgement message from the cache controller 108a). For example, the centralized controller 104 can enter a wait state to wait for an acknowledgement message from the cache controller 108a. Additionally, the cache controller 108a can send an acknowledgment message to the centralized controller 104 in response to receiving the snoop message.

In response to a determination that a processing component (e.g., a processing component 102a-n) is in a powered-down state (e.g., a powered-off state), the centralized controller 104 can be configured to not send (e.g., withhold from sending) a snoop message to a corresponding cache controller (e.g., cache controller 108a-n). Additionally, the centralized controller 104 can be configured to not expect a response from the cache controller (e.g., a cache controller 108a-n) in response to the determination that the processing component is in the powered-off state. For example, the centralized controller 104 can imply an acknowledgment message from the cache controller. Additionally, the centralized controller 104 can be configured to receive a powering-on message from a processing component 102a-n when a processing component 102a-n has returned to a powered-on state.

A powered-down state (e.g., powered-off state) can be a power state when a processing component 102a-n cannot respond (e.g., cannot independently respond) to a snoop message. For example, a powered-down state can include, but is not limited to, a state where one or more clocks are turned off, a state where a retention voltage is applied, etc. The powered-down state (e.g., powered-off state) can include a fully powered-off state, a sleep state, a hibernation state, etc. As such, a powered-down state (e.g., powered-off state) can include a power state where a processing component 102a-n does not receive a current supply, a processing component 102a-n receives a partial current supply, one or more components of the processing component 102a-n do not receive a current supply, etc.

In one non-limiting example, the centralized controller 104 can determine that the processing component 102a is in a powered-down state. As such, the centralized controller 104 can withhold from sending a snoop message to the cache controller 108a. Furthermore, the centralized controller 104 can determine that a response from the cache controller 108a (e.g., an acknowledgement message from the cache controller 108a) will not be sent to the centralized controller 104. As such, the centralized controller 104 can imply an acknowledgment message from the cache controller 108a instead of sending a snoop message to the cache controller 108a and waiting for an acknowledgment message from the cache controller 108a.

Therefore, power status information can be incorporated into snoop broadcasting (e.g., snoop messaging) and/or acknowledgment gathering (e.g., acknowledgment messaging). As a result, the system 100 can implement a broadcast (e.g., distribution) mechanism and/or a gathering mechanism for management of system power (e.g., the system 100 can implement snoop filtering for power management). Accordingly, the number of snoop messages and/or the number of acknowledgment messages in the system 100 can be reduced. As such, power management of the system 100 can be improved. Furthermore, each of the one or more processing component 102a-n in the system 100 can be implemented in a separate power domain so that snoop processing logic (e.g., snoop processing logic in the one or more cache controllers 108a-n) is not required to be powered-up at all times. Therefore, power-gating of the one or more processing component 102a-n can be enabled without requiring at least a portion of the snoop processing logic to be enabled.

Figure 2:
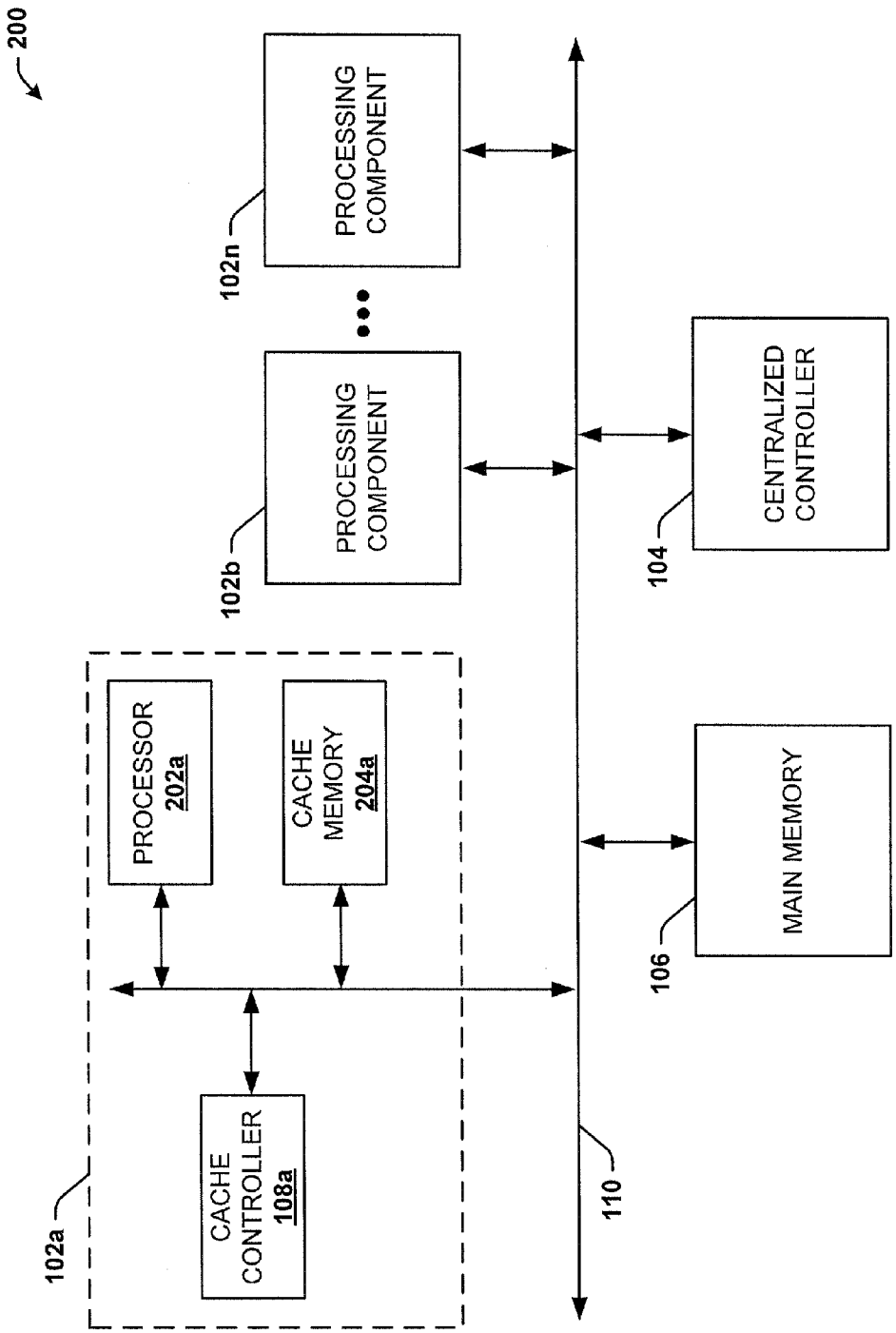
FIG. 2 is a block diagram illustrating an example, non-limiting embodiment of a processing component in accordance with various aspects described herein.

Referring now to FIG. 2, a block diagram illustrating an example, non-limiting embodiment of a system in accordance with various aspects described herein is shown. System 200 can include the one or more processing components 102a-n, the centralized controller 104 and the main memory 106. The system 200 can also include the one or more cache controllers 108a-n, one or more processors 202a-n and one or more cache memories 204a-n. Each of the one or more processing components 102a-n can include a cache controller, a processor and/or a cache memory. For example, the processing component 102a can include the cache controller 108a, the processor 202a and/or the cache memory 204a, the processing component 102b can include the cache controller 108b, the processor 202b and/or the cache memory 204b, etc. In one example, a cache controller (e.g. a cache controller 108a-n) can be implemented separate from a processor (e.g., a processor 202a-n). In another example, a processor (e.g., a processor 202a-n) can include a cache controller (e.g., a cache controller 108a-n). In one example, the one or more processors 202a-n can be implemented as processor cores (e.g., processor cores in a multi-core processor).

A copy of data stored in the main memory 106 can be stored in each of the cache memories 204a-n. Therefore, when data is updated in the main memory 106, the copies of the data stored in each of the cache memories 204a-n can also be updated. As such, the one or more cache controllers 108a-n can manage the cache memories 204a-n so that a most recent copy of data is stored in each of the cache memories 204a-n (e.g., a copy of data that matches data in the main memory 106 is stored in each of the cache memories 204a-n). Therefore, cache coherency can be achieved.

In one implementation, a cache controller, a processor and/or a cache memory in each processing component 102a-n can be coupled via a bus (e.g., the bus 110 and/or a bus coupled to the bus 110). In another implementation, only a cache controller in each processing component 102a-n can be coupled to the bus 110, where the cache controller can additionally be coupled to a processor and a cache memory. As such, a cache controller in each processing component 102a-n can isolate a processor and/or a cache memory from the bus 110.

The centralized controller 104 can be configured to communicate with the processing components 102a-n (e.g., the cache controllers 108a-n) based on a power state of the one or more processors 202a-n. For example, the centralized controller 104 can be configured to send a snoop message to the cache controllers 108a-n and/or receive an acknowledgment message from the cache controllers 108a-n based on a power state of a respective processor 202a-n. As such, the centralized controller 104 can filter snoop messages and/or acknowledgment messages based on the power state of the processors 202a-n.

Additionally or alternatively, the centralized controller 104 can be configured to communicate with the processing components 102a-n (e.g., the cache controllers 108a-n) based on a power state of the one or more cache controllers 108a-n. For example, the centralized controller 104 can be configured to send a snoop message to the cache controllers 108a-n and/or receive an acknowledgment message from the cache controllers 108a-n based on a power state of a respective cache controller 108a-n. As such, the centralized controller 104 can additionally or alternatively filter snoop messages and/or acknowledgment messages based on the power state of the cache controllers 108a-n. The centralized controller 104 can be configured to store a power state for each of the processors 202a-n and/or each of the cache controllers 108a-n. The centralized controller 104 can be configured to determine a power state for each processor 202a-n and/or each cache controller 108a-n. For example, the centralized controller 104 can comprise control logic (e.g., power state logic) to determine a power state for each processor 202a-n and/or each cache controller 108a-n. As such, the centralized controller 104 can associate each of the one or more processing component 102a-n (e.g., each of the one or more processors 202a-n and/or each of the one or more cache controllers 108a-n) with a unique power domain.

The centralized controller 104 can be configured to send a snoop message to a cache controller (e.g., a cache controller 108a-n) in response to a determination that a corresponding processor (e.g., processor 202a-n) and/or a corresponding cache controller 108a-n is in a powered-up state. The cache controller (e.g., a cache controller 108a-n) can be configured to send an acknowledgment message to the centralized controller in response to receiving the snoop message. Furthermore, the centralized controller 104 can be configured to enter a wait state for the acknowledgment message in response to sending the snoop message.

In one non-limiting example, the centralized controller 104 can determine that the processor 202a (and/or cache controller 108a-n) is in a powered-up state. As such, the centralized controller 104 can send a snoop message to the cache controller 108a. Furthermore, the centralized controller 104 can expect a response from the cache controller 108a (e.g., an acknowledgement message from the cache controller 108a). For example, the centralized controller 104 can enter a wait state to wait for an acknowledgement message from the cache controller 108a. Additionally, the cache controller 108a can send an acknowledgment message to the centralized controller 104 in response to receiving the snoop message.

In response to a determination that a processor (e.g., a processor 202a-n) and/or a cache controller (e.g., cache controller 108a-n) is in a powered-down state, the centralized controller 104 can be configured to not send (e.g., withhold from sending) a snoop message to a corresponding cache controller (e.g., cache controller 108a-n). Additionally, the centralized controller 104 can be configured to not expect a response from the cache controller (e.g., a cache controller 108a-n) in response to the determination that the processor (e.g., the processor 202a-n) is in the powered-down state. For example, the centralized controller 104 can imply an acknowledgment message from the cache controller. In one example, the centralized controller 104 can be configured to turn off (e.g., discontinue) current supply to a cache controller 108a-n in response to a determination that a corresponding processor 202a-n is in a powered-down state. Additionally, the centralized controller 104 can be configured to receive a powering-on message from a processor 202a-n or a cache controller 108a-n when a processor 202a-n and/or a cache controller 108a-n has returned to a powered-on state.

A powered-down state (e.g., powered-off state) can be a power state when a processor 202a-n and/or a cache controller 108a-n cannot respond (e.g., cannot independently respond) to a snoop message. For example, a powered-down state can include, but is not limited to, a state where one or more clocks are turned off, a state where a retention voltage is applied, etc. The powered-down state (e.g., powered-off state) can include a fully powered-off state or a partially powered-off state.

In one non-limiting example, the centralized controller 104 can determine that the processor 202a (and/or the cache controller 108a) is in a powered-down state. As such, the centralized controller 104 can withhold from sending a snoop message to the cache controller 108a. Furthermore, the centralized controller 104 can determine that a response from the cache controller 108a (e.g., an acknowledgement message from the cache controller 108a) will not be sent to the centralized controller 104. As such, the centralized controller 104 can imply an acknowledgment message from the cache controller 108a instead of sending a snoop message to the cache controller 108a and waiting for an acknowledgment message from the cache controller 108a. As such, snoop messages and/or acknowledgment messages can be reduced based on a power state of the processors 202a-n and/or the cache controllers 108a-n.

Figure 3:
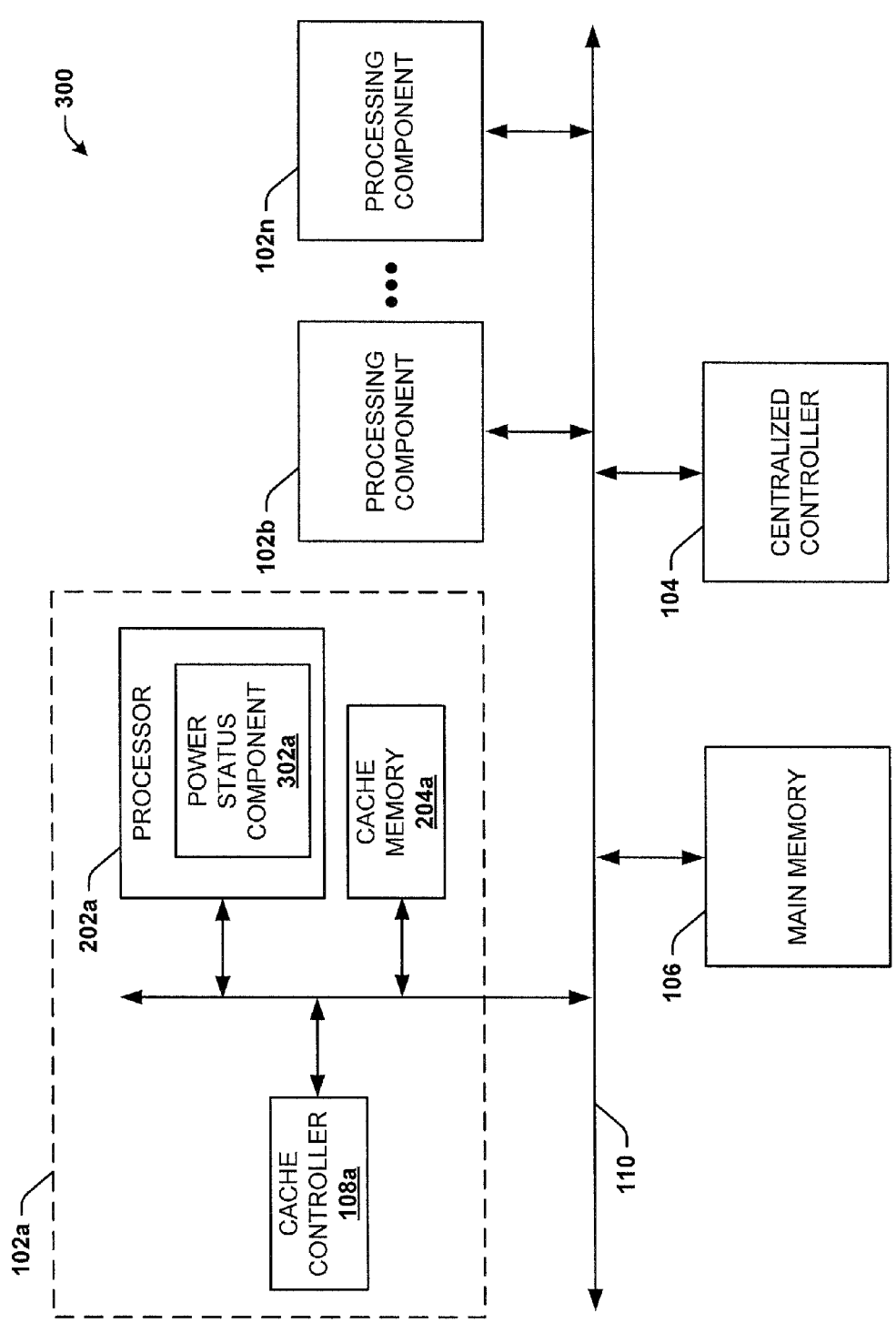
FIG. 3 is a block diagram illustrating an example, non-limiting embodiment of a processor in accordance with various aspects described herein.

Referring now to FIG. 3, a block diagram illustrating an example, non-limiting embodiment of a system in accordance with various aspects described herein is shown. System 300 can include the one or more processing components 102a-n, the centralized controller 104 and the main memory 106. The system 300 can also include the one or more cache controllers 108a-n, the one or more processors 202a-n and the one or more cache memories 204a-n. Additionally, the system 300 can include one or more power status components 302a-n. For example, each of the one or more processors 202a-n can include a power status component (e.g., the processor 202a can include a power status component 302a, the processor 202b can include a power status component 302b, etc.). In one example, a processor (e.g., a processor 202a-n) can additionally include a cache controller (e.g., a cache controller 108a-n).

Each of the power status components 302a-n can be configured to provide power state information for a corresponding processor (e.g., the power status component 302a can provide power state information for the processor 202a, the power status component 302b can provide power state information for the processor 202b, etc.). For example, the power status components 302a-n can send a signal (e.g., a message) to the centralized controller 104 when a corresponding processor is powering down. In one example, the power status component 302a can send a powering-down signal (e.g., a powering-down message, a powering-off message, etc.) when the processor 202a is powering down (e.g., before the processor 202a powers down). Additionally, the power status components 302a-n can send a signal (e.g., a message) to the centralized controller 104 when a corresponding processor is powering up. In one example, the power status component 302a can send a powering-up signal (e.g., a powering-up message, a powering-on message, etc.) when the processor 202a is powering down (e.g., when the processor 202a turns back on).

Figure 4:
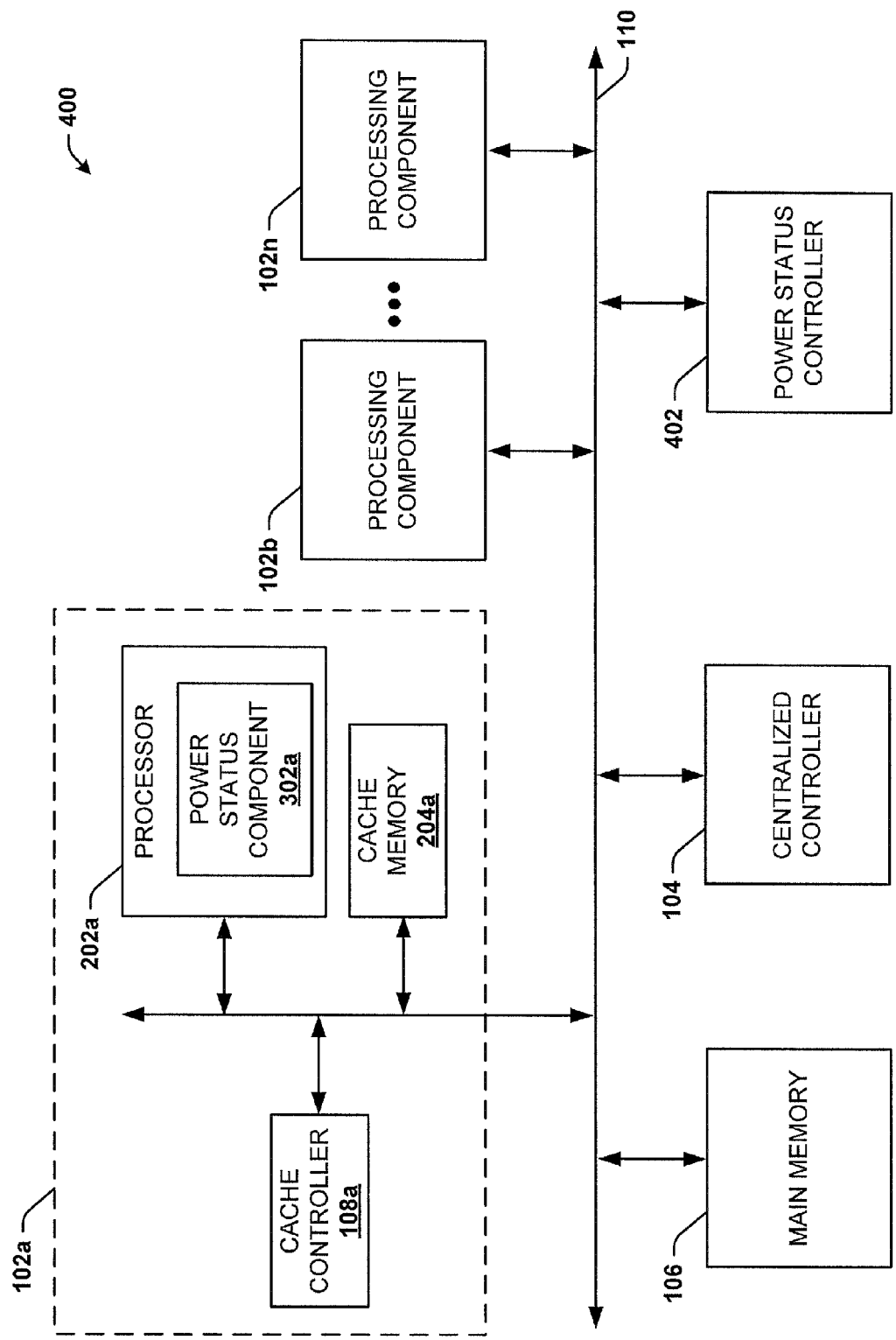
FIG. 4 is a block diagram illustrating an example, non-limiting embodiment of a multiprocessor system with a power management controller in accordance with various aspects described herein.

Referring now to FIG. 4, a block diagram illustrating an example, non-limiting embodiment of a system in accordance with various aspects described herein is shown. System 400 can include the one or more processing components 102a-n, the centralized controller 104 and the main memory 106. The system 400 can also include the one or more cache controllers 108a-n, the one or more processors 202a-n, the one or more cache memories 204a-n and/or the power status components 302a-n. Additionally, the system 400 can include a power status controller 402. In one example, the power status controller 402 can be implemented as a microcontroller.

The power status controller 402 can be configured to maintain power status information for each of the processors 202a-n. For example, the power status controller 402 can be configured to maintain a power state of each of the processors 202a-n. The power status controller 402 can be configured to send the power status information (e.g., the power states) for each of the processors 202a-n to the centralized controller 104. For example, the power status controller 402 can send one or more power state messages to the centralized controller 104. As such, the centralized controller 104 can determine the power states for each of the processors 202a-n via the power status controller 402. In one example, the power status controller 402 can include power status firmware.

In one example, the power status components 302a-n can send a signal (e.g., a message) to the power status controller 402 when a corresponding processor is powering down. In one example, the power status component 302a can send a powering-down signal (e.g., a powering-down message, a powering-off message, etc.) to the power status controller 402 when the processor 202a is powering down (e.g., before the processor 202a powers down). Additionally, the power status components 302a-n can send a signal (e.g., a message) to the power status controller 402 when a corresponding processor is powering up. In one example, the power status component 302a can send a powering-up signal (e.g., a powering-up message, a powering-on message, etc.) to the power status controller 402 when the processor 202a is powering up (e.g., when the processor 202a turns back on). Therefore, the power status controller 402 can maintain power state information for each of the processors 202a-n.

Figure 5:
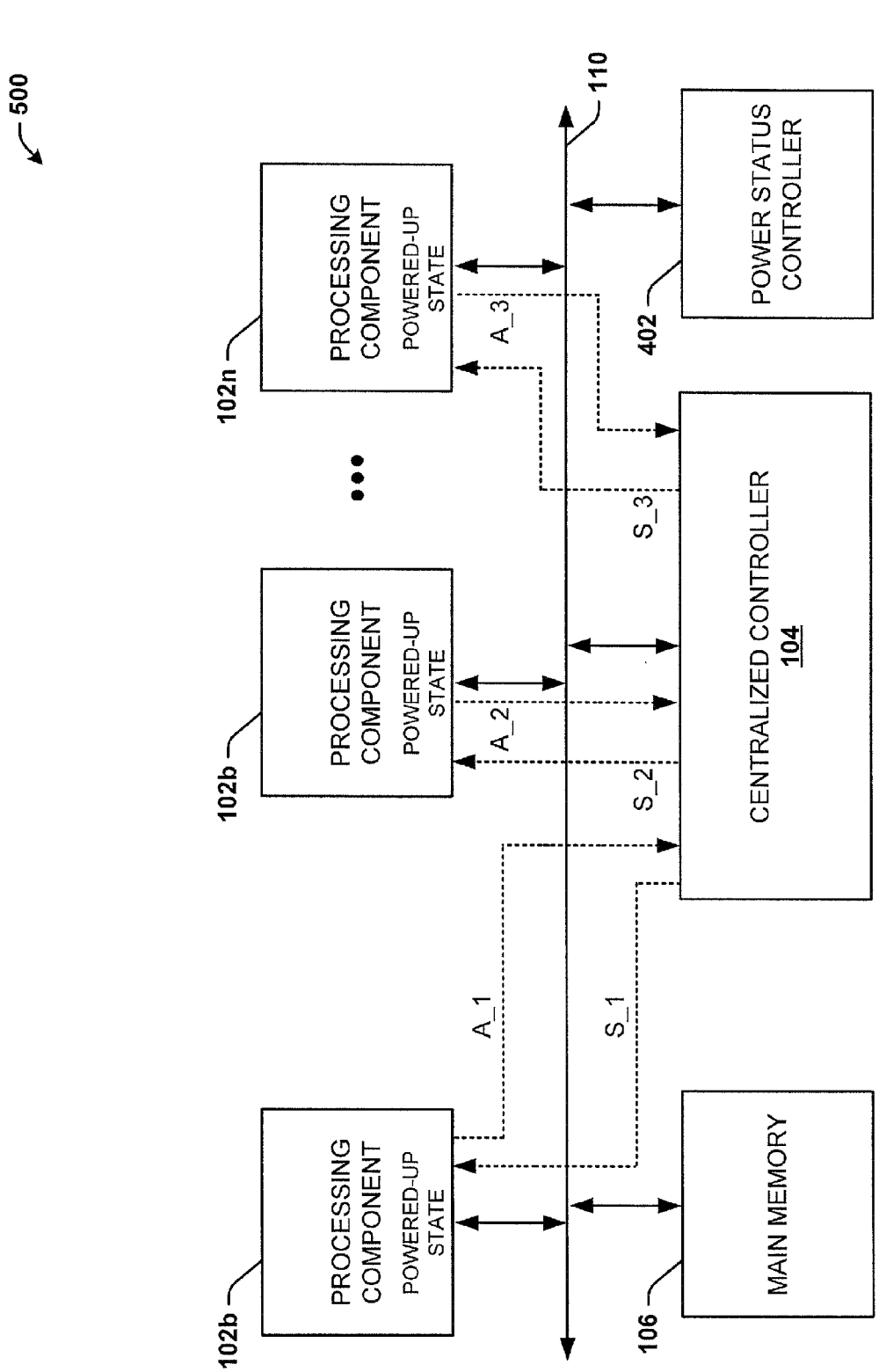
FIG. 5 is a block diagram illustrating an example, non-limiting embodiment of a multiprocessor system implementing a cache coherence protocol for power management in accordance with various aspects described herein.

Referring to FIG. 5, a block diagram illustrating an example, non-limiting embodiment of a multiprocessor system implementing a cache coherence protocol for power management in accordance with various aspects described herein is shown. System 500 can include the one or more processing components 102a-n, the centralized controller 104 and the main memory 106. The system 500 can also include the one or more cache controllers 108a-n, the one or more processors 202a-n, the one or more cache memories 204a-n and/or the power status components 302a-n. Additionally, the system 500 can include the power status controller 402.

In the non-limiting example shown in FIG. 5, processing component 102a is in a powered-up state (e.g., processor 202a is turned on), processing component 102b is in a powered-up state (e.g., processor 202b is turned on) and processing component 102n is in a powered-up state (e.g., processor 202n is turned on). As such, the centralized controller 104 can send a first snoop message (e.g., S_1) to the cache controller 108a, a second snoop message (e.g., S_2) to the cache controller 108b and a third snoop message (e.g., S_3) to the cache controller 108n. In response to the first snoop message, the cache controller 108a can send a first acknowledgment message (e.g., A_1) to the centralized controller 104. Additionally, in response to the second snoop message, the cache controller 108b can send a second acknowledgment message (e.g., A_2) to the centralized controller 104. Furthermore, in response to the third snoop message, the cache controller 108n can send a third acknowledgment message (e.g., A_3) to the centralized controller 104. As such, the centralized controller 104 can broadcast a snoop message to each cache controller in the system 500 (e.g., cache controller 108a, cache controller 108b and cache controller 108n) since every processing component in the system 500 (e.g., the processing component 102a, the processing component 102b and the processing 102n) is in a powered-up state.

Figure 6:
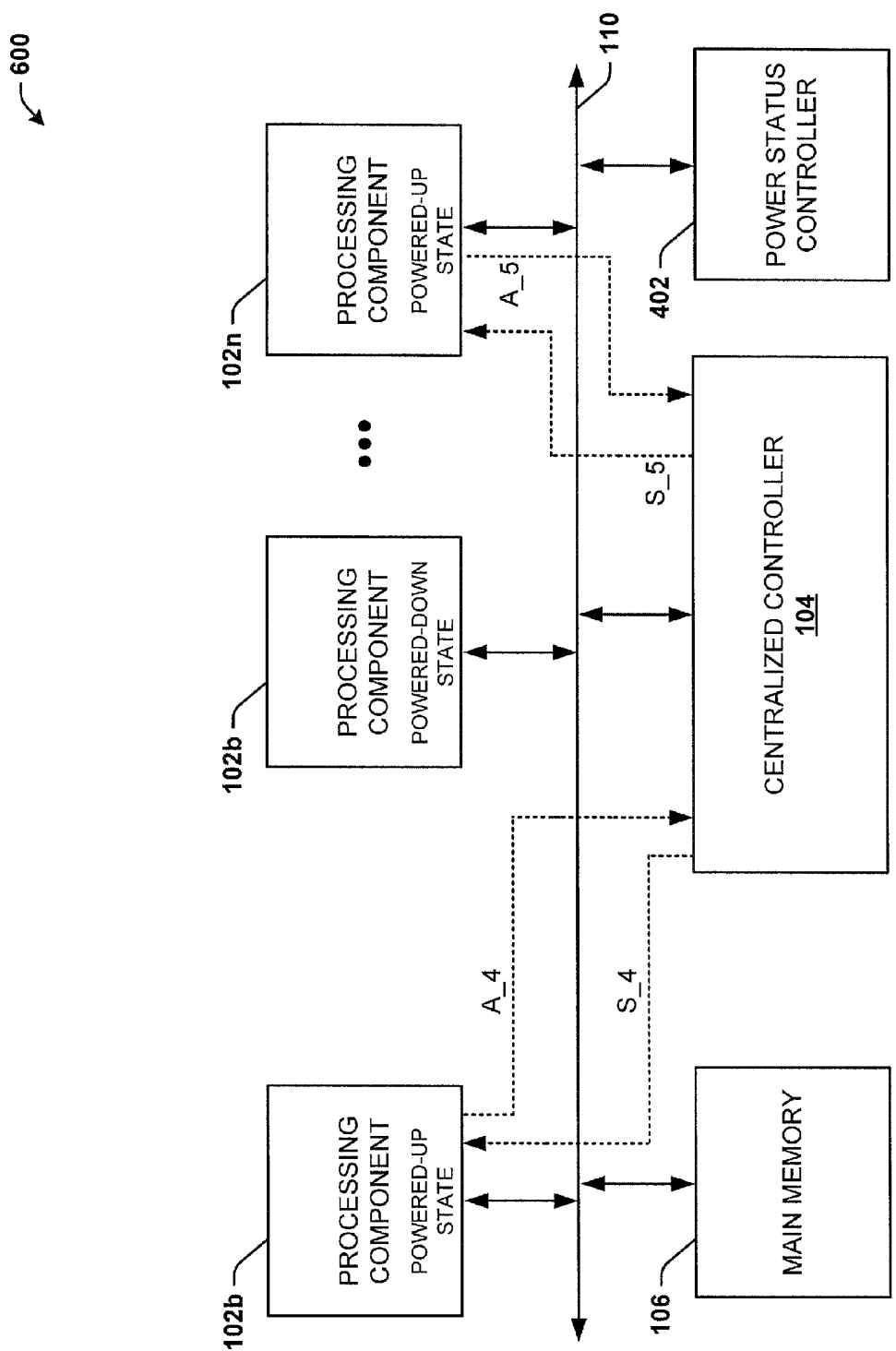
FIG. 6 is a block diagram illustrating another example, non-limiting embodiment of a multiprocessor system implementing a cache coherence protocol for power management in accordance with various aspects described herein.

Referring now to FIG. 6, a block diagram illustrating another example, non-limiting embodiment of a multiprocessor system implementing a cache coherence protocol for power management in accordance with various aspects described herein is shown. System 600 can include the one or more processing components 102a-n, the centralized controller 104 and the main memory 106. The system 600 can also include the one or more cache controllers 108a-n, the one or more processors 202a-n, the one or more cache memories 204a-n and/or the power status components 302a-n. Additionally, the system 500 can include the power status controller 402.

In the non-limiting example shown in FIG. 6, processing component 102a is in a powered-up state (e.g., processor 202a is turned on), processing component 102b is in a powered-down state (e.g., processor 202b is turned off) and processing component 102n is in a powered-up state (e.g., processor 202n is turned on). As such, the centralized controller 104 can send a first snoop message (e.g., S_4) to the cache controller 108a and a second snoop message (e.g., S_5) to the cache controller 108n. The centralized controller 104 can withhold from sending a snoop message to the cache controller 108b since the processing component 102b (e.g., the processor 202b) is in a powered-down state. In response to the first snoop message, the cache controller 108a can send a first acknowledgment message (e.g., A_4) to the centralized controller 104. Additionally, in response to the second snoop message, the cache controller 108n can send a second acknowledgment message (e.g., A_5) to the centralized controller 104. Furthermore, the centralized controller 104 can imply an acknowledgment message from the cache controller 108b since the processing component 102b (e.g., the processor 202b) is in a powered-down state.

As such, the centralized controller 104 can broadcast a snoop message only to the cache controller(s) in the system 600 with an associated processing component (e.g., processor) in a powered-up state (e.g., cache controller 108a and cache controller 108n). However, the centralized controller 104 can withhold from sending a snoop message to the cache controller(s) in the system 600 with an associated processing component (e.g., processor) in a powered-down state (e.g., cache controller 108b). As such, the number of snoop messages and/or acknowledgment messages generated in the system 600 can be reduced.

In view of the example systems described above, methods that may be implemented in accordance with the described subject matter may be better appreciated with reference to the flow charts of FIGS. 7-11. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 7:
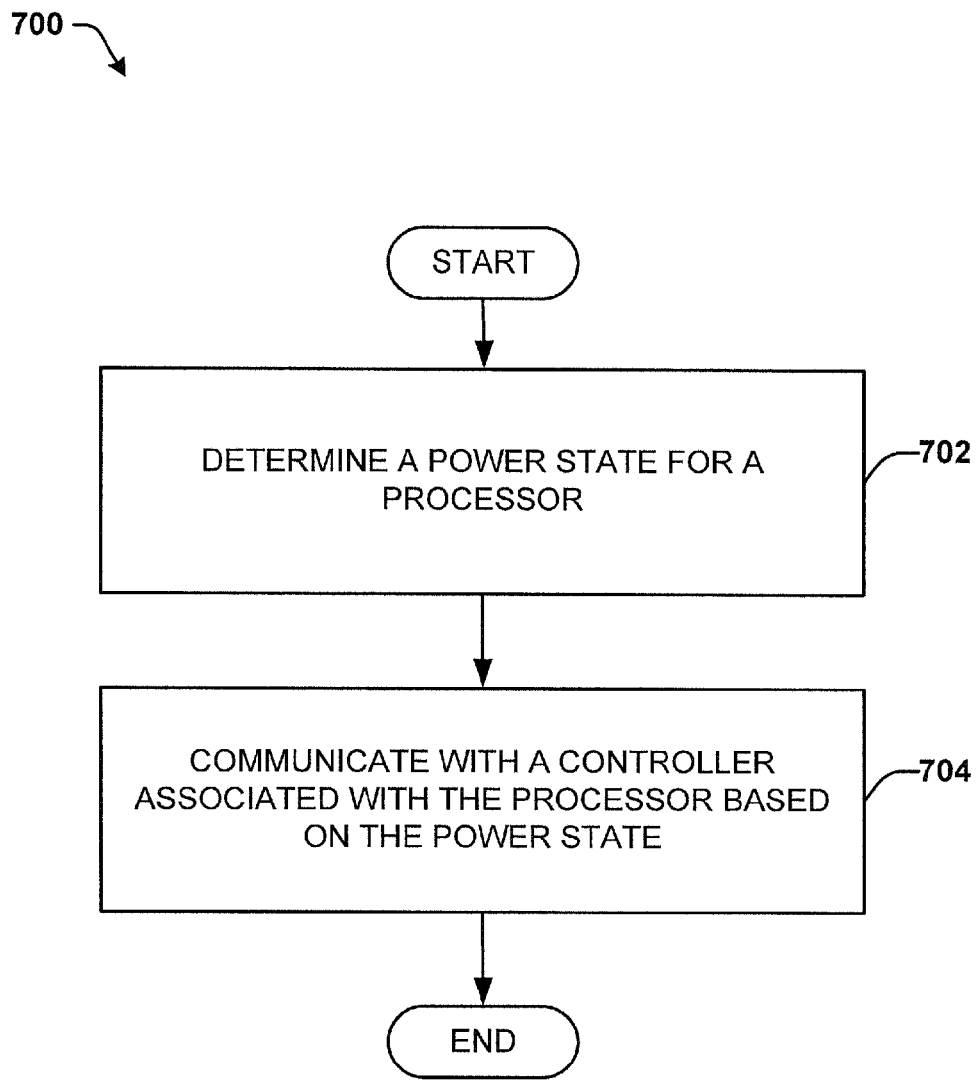
FIG. 7 illustrates a flow diagram of an example, non-limiting embodiment of a method for implementing a cache coherence protocol for power management.

Referring to FIG. 7, a flow diagram of an example, non-limiting embodiment of a method for implementing a cache coherence protocol for power management is shown. Method 700 can begin at block 702, where a power state for a processor is determined (e.g., using a centralized controller 104). For example, it can be determined whether a processor is in a power-up state or a powered-down state. In one example, power state information (e.g., a power state message) for the processor can be received from controller logic and/or a microcontroller (e.g., power management controller 402).

At block 704, a controller associated with the processor can be communicated with (e.g., using a centralized controller 104) based on the power state. For example, a snoop message can be sent to a controller (e.g., a cache controller) associated with the processor in response to a determination that the processor is in a powered-up state. Alternatively, communication with the controller (e.g., the cache controller) can be withheld (e.g., a snoop message is not sent to the controller) in response to a determination that the processor is in a powered-down state.

Figure 8:
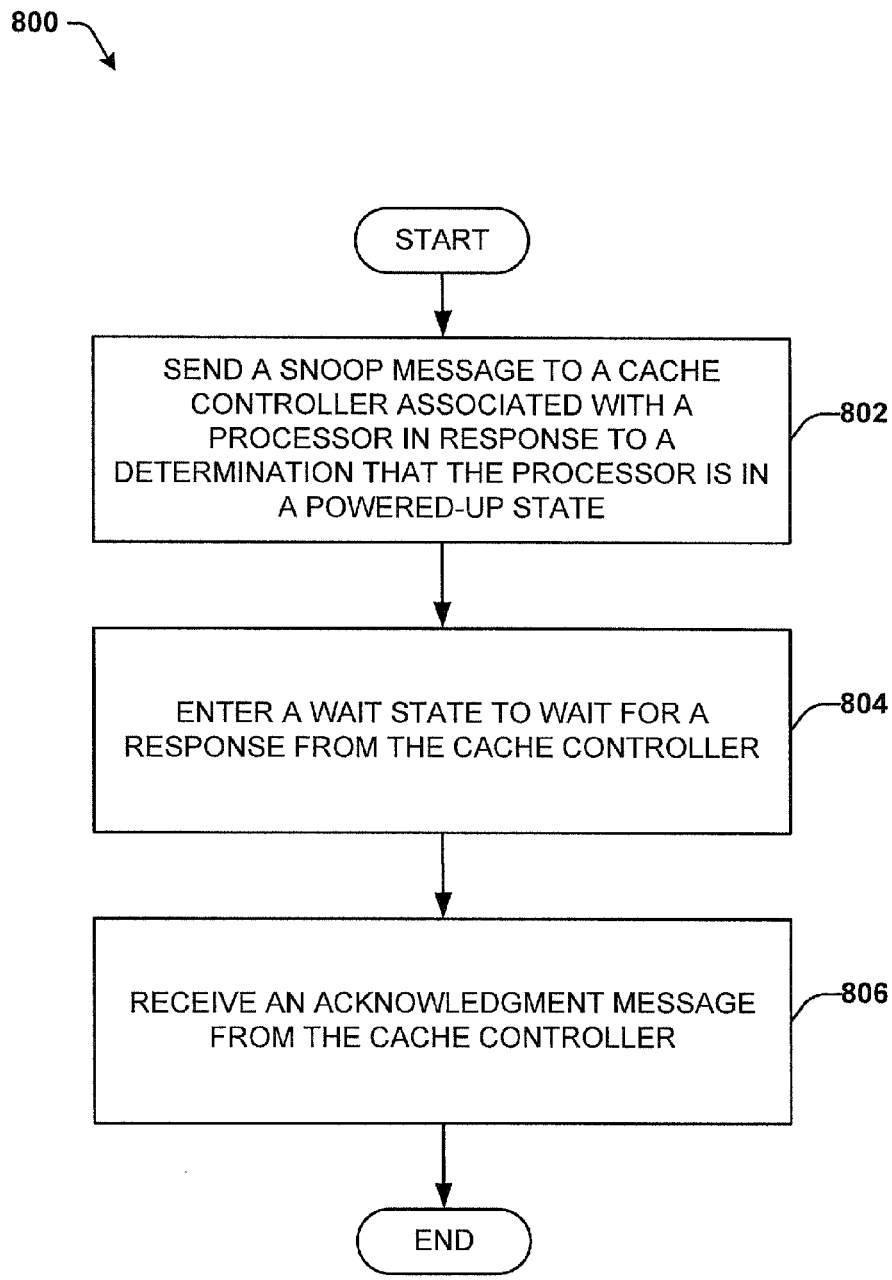
FIG. 8 illustrates a flow diagram of an example, non-limiting embodiment of a method for implementing a cache coherence protocol for power management via a centralized controller.

Referring now to FIG. 8, a flow diagram of an example, non-limiting embodiment of a method for implementing a cache coherence protocol for power management via a centralized controller is shown. Method 800 can begin at block 802, where a snoop message is sent to a cache controller associated with a processor (e.g., using a centralized controller 104) in response to a determination that the processor is in a powered-up state. For example, it can be determined that a processor is in a power-up state. Therefore, a snoop message can be sent to a cache controller associated with the processor.

At block 804, a wait state is entered to wait for a response from the cache controller. For example, a wait state can be entered to wait for an acknowledgment message from the cache controller.

At block 806, an acknowledgment message is received from the cache controller (e.g., using a centralized controller 104). For example, the cache controller can send an acknowledgment message in response to receiving the snoop message.

Figure 9:
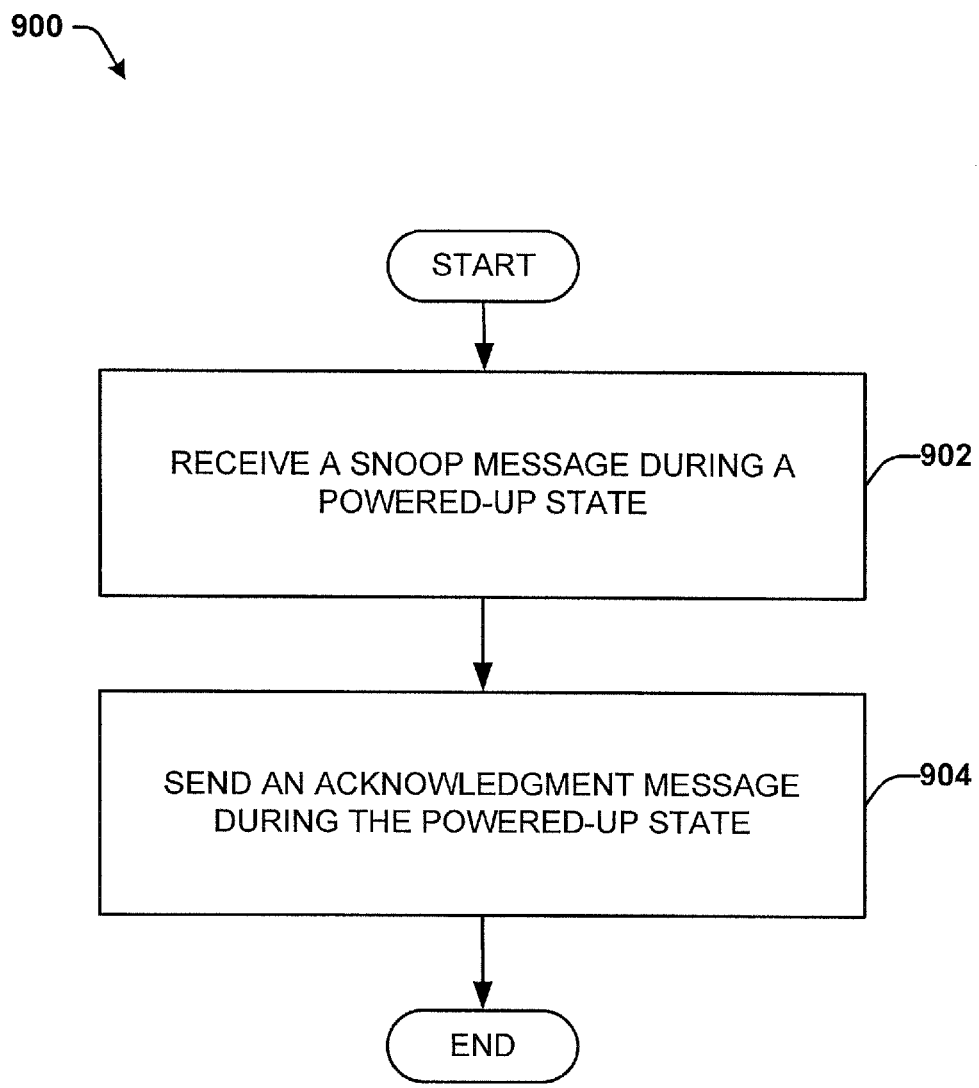
FIG. 9 illustrates a flow diagram of an example, non-limiting embodiment of a method for implementing a cache coherence protocol for power management via a cache controller associated with a processor.

Referring now to FIG. 9, a flow diagram of an example, non-limiting embodiment of a method for implementing a cache coherence protocol for power management via a cache controller associated with a processor is shown. Method 900 can begin at block 902, where a snoop message is received (e.g., by a cache controller 108a-n) during a powered-up state. For example, when a processor is in a powered-up state, a cache controller associated with the snoop message can receive a snoop message.

At block 904, an acknowledgment message is (e.g., by a cache controller 108a-n) sent during the powered-up state. For example, in response to receiving the snoop message, the cache controller associated with the processor can generate an acknowledgment message when in a powered-up state.

Figure 10:
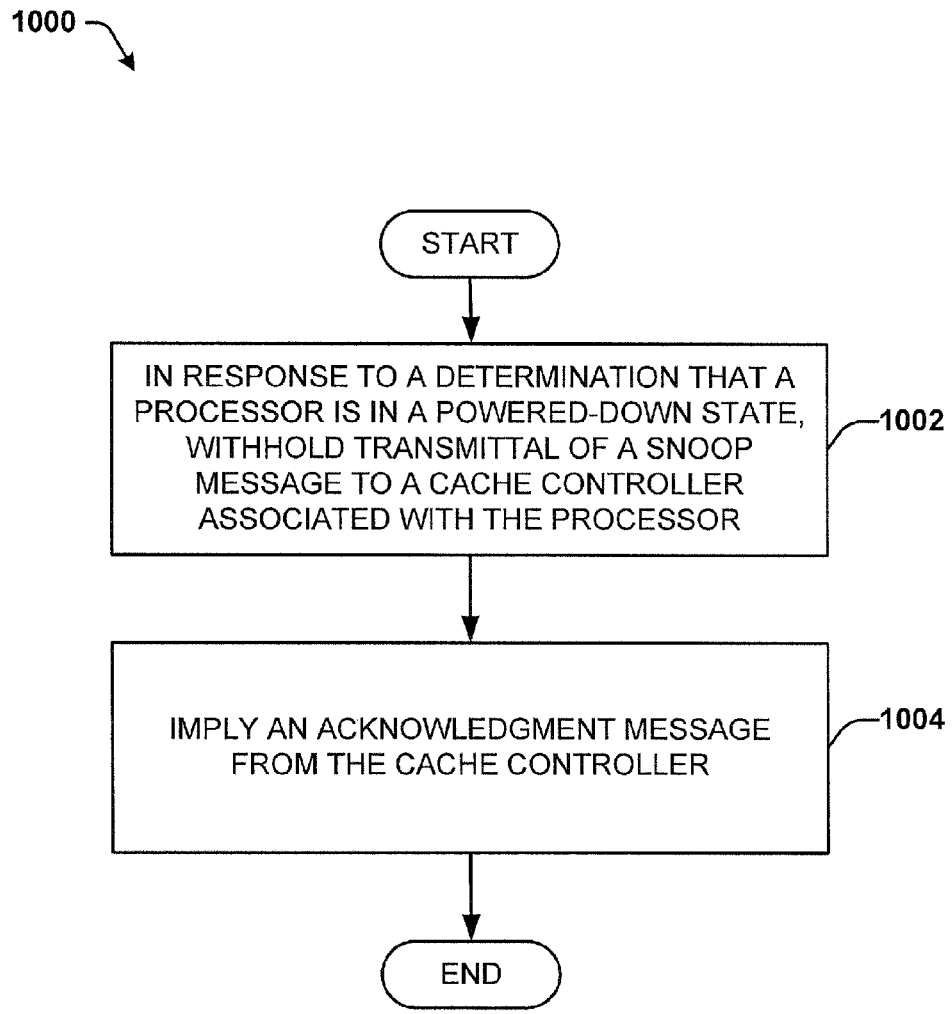
FIG. 10 illustrates a flow diagram of another example, non-limiting embodiment of a method for implementing a cache coherence protocol for power management via a centralized controller.

Referring now to FIG. 10, a flow diagram of another example, non-limiting embodiment of a method for implementing a cache coherence protocol for power management via a centralized controller is shown. Method 1000 can begin at block 1002, where, in response to a determination that a processor is in a powered-down state, transmittal of a snoop message to a cache controller associated with the processor is withheld (e.g., by a centralized controller 104). For example, it can be determined that a processor is off or partially off. Therefore, a snoop message is not sent to a cache controller associated with the processor.

At 1004, an acknowledgment message from the cache controller is implied (e.g., by a centralized controller 104). For example, instead of entering a wait state, it can be determined that the cache controller associated with the processor is not going to send an acknowledgment message.

Figure 11:
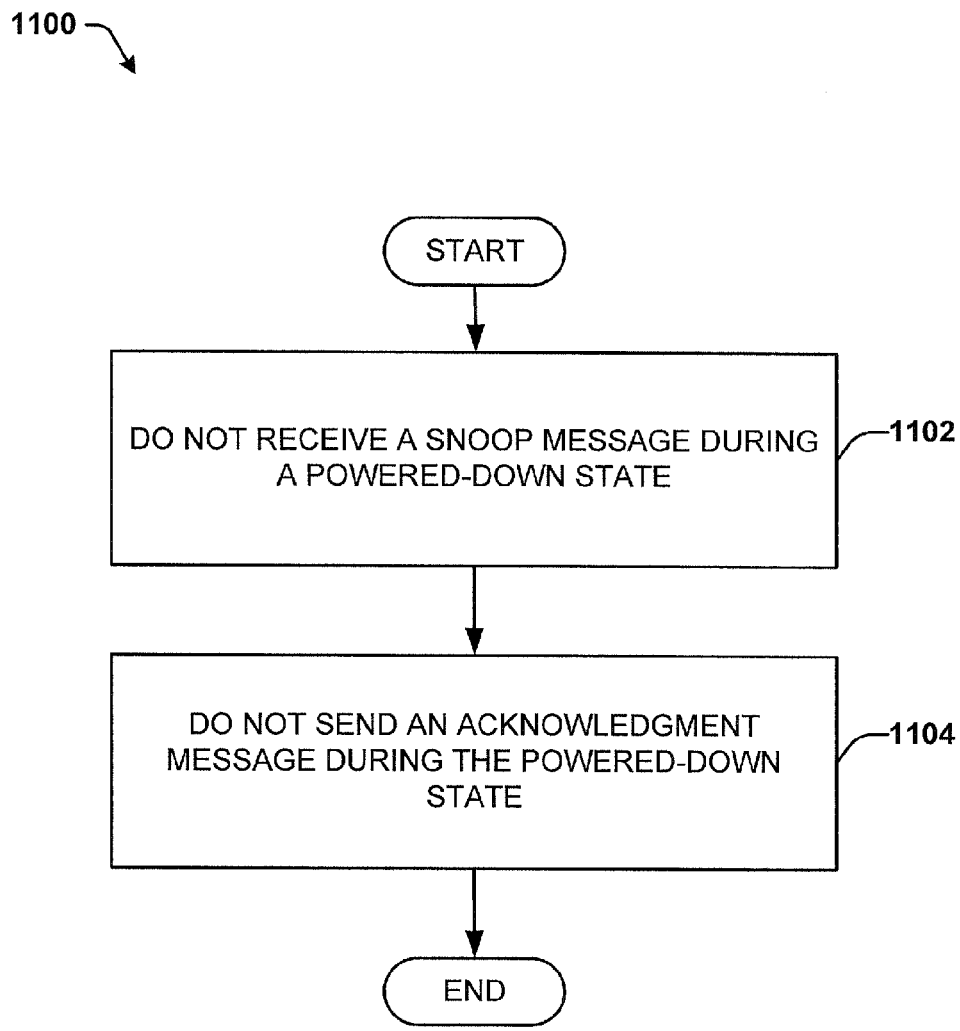
FIG. 11 illustrates a flow diagram of another example, non-limiting embodiment of a method for implementing a cache coherence protocol for power management via a cache controller associated with a processor.

Referring now to FIG. 11, a flow diagram of another example, non-limiting embodiment of a method for implementing a cache coherence protocol for power management via a cache controller associated with a processor is shown. Method 1100 can begin at block 1102, where a snoop message is not received (e.g., by a cache controller 108a-n) during a powered-down state. For example, when a processor is in a powered-down state, a cache controller associated with the snoop message does not receive a snoop message.

At block 1104, an acknowledgment message is not sent (e.g., by a cache controller 108a-n) during the powered-down state. For example, when the processor is in the powered-down state, the cache controller associated with the processor does not generate an acknowledgment message.

Figure 12:
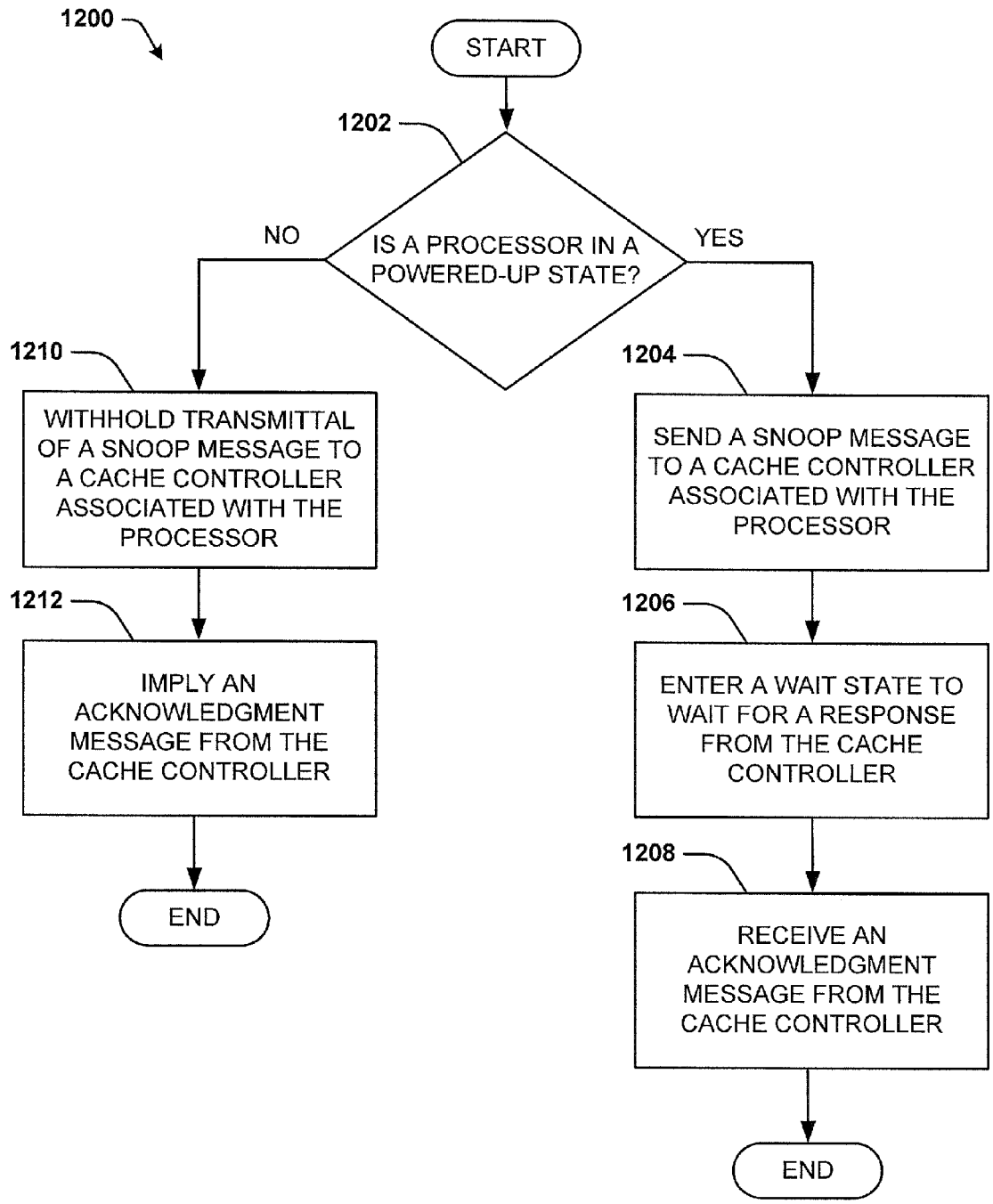
FIG. 12 illustrates a flow diagram of an example, non-limiting embodiment of a method for broadcast messaging and acknowledgment messaging for power management in a multiprocessor system.

Referring now to FIG. 12, a flow diagram of an example, non-limiting embodiment of a method for broadcast messaging and acknowledgment messaging for power management in a multiprocessor system is shown. Method 1200 can begin at block 1202, where it can be determined whether a processor is in a powered-up state (e.g., using a centralized controller 104). For example, it can be determined whether a processor is on (e.g., whether a processor is fully on).

If yes, the method 1200 proceeds to block 1204. At block 1204, a snoop message is sent (e.g., using a centralized controller 104) to a cache controller associated with the processor. For example, a snoop message can be sent to the cache controller associated with the processor via a bus.

At block 1206, a wait state is entered (e.g., by a centralized controller 104) to wait for a response from the cache controller. For example, a wait state can be entered to wait for an acknowledgment message from the cache controller via the bus.

At block 1208, an acknowledgment message is received (e.g., by a centralized controller 104) from the cache controller. For example, the cache controller can send an acknowledgment message via the bus in response to receiving the snoop message.

If no, the method proceeds to block 1210. At block 1210, transmittal of a snoop message to a cache controller associated with the processor is withheld (e.g., by a centralized controller 104). For example, a snoop message is not sent to a cache controller associated with the processor.

At 1212, an acknowledgment message from the cache controller is implied (e.g., by a centralized controller 104). For example, instead of entering a wait state, it can be determined that the cache controller associated with the processor is not going to send an acknowledgment message.

Example Computing Environment

Figure 13:
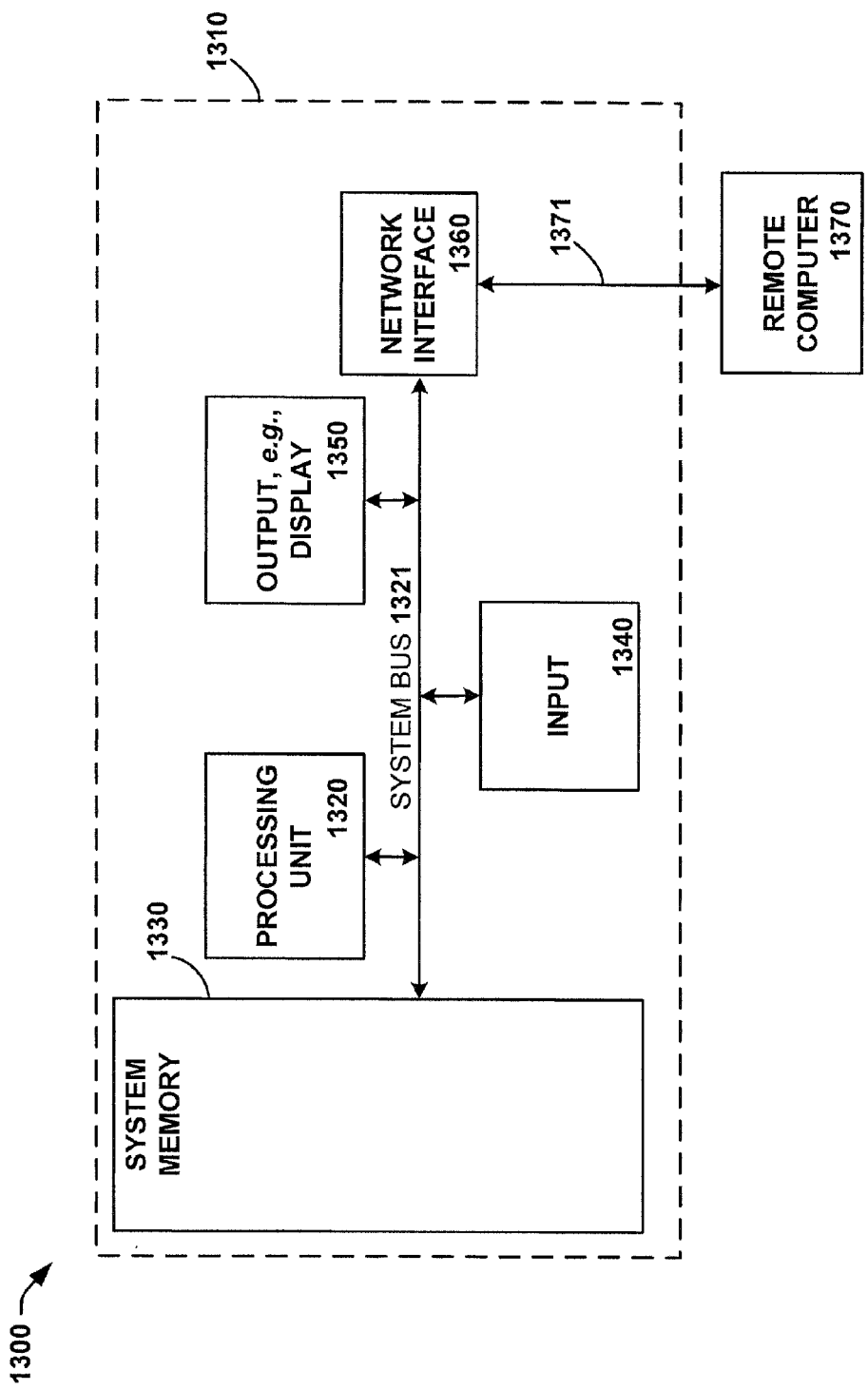
FIG. 13 illustrates a block diagram of an example electronic computing environment that can be implemented in conjunction with one or more aspects described herein.

As mentioned, advantageously, the techniques described herein can be applied to any device and/or network where power management is desirable in a multiprocessor system. It is to be understood, therefore, that handheld, portable and other computing devices and computing objects of all kinds are contemplated for use in connection with the various non-limiting embodiments, i.e., anywhere that a device may wish to implement power management for a multiprocessor system. Accordingly, the below general purpose remote computer described below in FIG. 13 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 13 thus illustrates an example of a suitable computing system environment 1300 in which some aspects of the disclosed subject matter can be implemented, although as made clear above, the computing system environment 1300 is only one example of a suitable computing environment for a device and is not intended to suggest any limitation as to the scope of use or functionality of the disclosed subject matter. Neither should the computing environment 1300 be interpreted as having any dependency or requirement relating to any one or combination of components illustrated in the exemplary operating environment 1300.

With reference to FIG. 13, an exemplary device for implementing the disclosed subject matter includes a general-purpose computing device in the form of a computer 1310. Components of computer 1310 may include, but are not limited to, a processing unit 1320, a system memory 1330, and a system bus 1321 that couples various system components including the system memory to the processing unit 1320. The system bus 1321 may be any of several types of bus structures including a memory bus or memory controller, a peripheral bus, and a local bus using any of a variety of bus architectures.

Computer 1310 typically includes a variety of computer readable media. Computer readable media can be any available media that can be accessed by computer 1310. By way of example, and not limitation, computer readable media can comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1310. Communication media typically embodies computer readable instructions, data structures, program modules, or other data in a modulated data signal such as a carrier wave or other transport mechanism and includes any information delivery media.

The system memory 1330 may include computer storage media in the form of volatile and/or nonvolatile memory such as read only memory (ROM) and/or random access memory (RAM). A basic input/output system (BIOS), containing the basic routines that help to transfer information between elements within computer 1310, such as during start-up, may be stored in memory 1330. Memory 1330 typically also contains data and/or program modules that are immediately accessible to and/or presently being operated on by processing unit 1320. By way of example, and not limitation, memory 1330 may also include an operating system, application programs, other program modules, and program data.

The computer 1310 may also include other removable/non-removable, volatile/nonvolatile computer storage media. For example, computer 1310 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 1321 through a non-removable memory interface such as an interface, and a magnetic disk drive or optical disk drive is typically connected to the system bus 1321 by a removable memory interface, such as an interface.

A user can enter commands and information into the computer 1310 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 1320 through user input 1340 and associated interface(s) that are coupled to the system bus 1321, but may be connected by other interface and bus structures, such as a parallel port, game port, or a universal serial bus (USB). A graphics subsystem can also be connected to the system bus 1321. A projection unit in a projection display device, or a HUD in a viewing device or other type of display device can also be connected to the system bus 1321 via an interface, such as output interface 1350, which may in turn communicate with video memory. In addition to a monitor, computers can also include other peripheral output devices such as speakers which can be connected through output interface 1350.

The computer 1310 can operate in a networked or distributed environment using logical connections to one or more other remote computer(s), such as remote computer 1370, which can in turn have media capabilities different from device 1310. The remote computer 1370 can be a personal computer, a server, a router, a network PC, a peer device, personal digital assistant (PDA), cell phone, handheld computing device, a projection display device, a viewing device, or other common network node, or any other remote media consumption or transmission device, and may include any or all of the elements described above relative to the computer 1310. The logical connections depicted in FIG. 13 include a network 1371, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 1310 can be connected to the LAN 1371 through a network interface or adapter. When used in a WAN networking environment, the computer 1310 can typically include a communications component, such as a modem, or other means for establishing communications over the WAN, such as the Internet. A communications component, such as wireless communications component, a modem and so on, which can be internal or external, can be connected to the system bus 1321 via the user input interface of input 1340, or other appropriate mechanism. In a networked environment, program modules depicted relative to the computer 1310, or portions thereof, can be stored in a remote memory storage device. It will be appreciated that the network connections shown and described are exemplary and other means of establishing a communications link between the computers can be used.

Example Networking Environment

Figure 14:
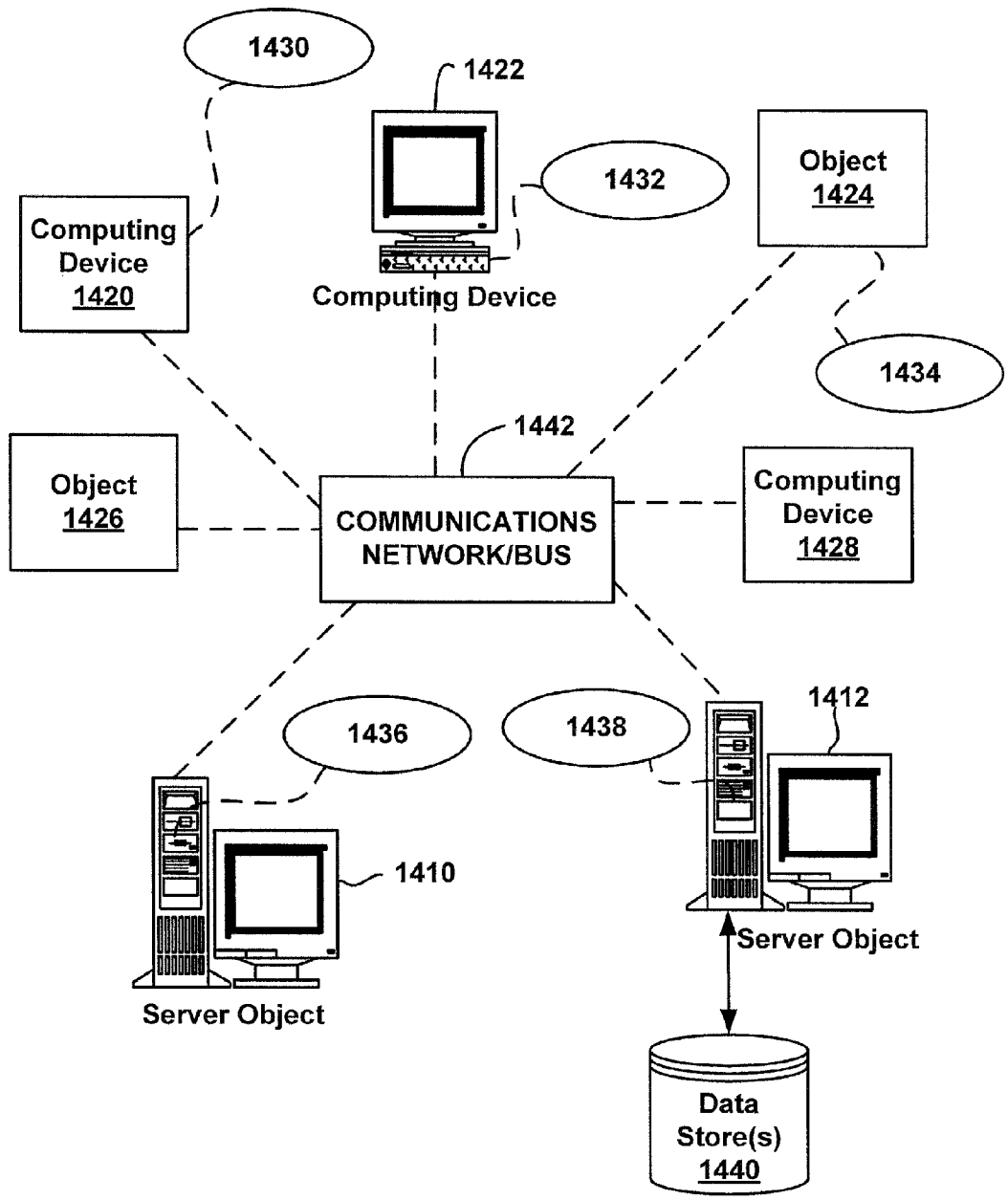
FIG. 14 illustrates a block diagram of an example data communication network that can be operable in conjunction with various aspects described herein.

FIG. 14 provides a schematic diagram of an exemplary networked or distributed computing environment. The distributed computing environment comprises computing objects 1410, 1412, etc. and computing objects or devices 1420, 1422, 1424, 1426, 1428, etc., which may include programs, methods, data stores, programmable logic, etc., as represented by applications 1430, 1432, 1434, 1436, 1438 and data store(s) 1440. It can be appreciated that computing objects 1410, 1412, etc. and computing objects or devices 1420, 1422, 1424, 1426, 1428, etc. may comprise different devices, including a multimedia display device or similar devices depicted within the illustrations, or other devices such as a mobile phone, personal digital assistant (PDA), audio/video device, MP3 players, personal computer, laptop, etc. It should be further appreciated that data store(s) 1440 can include one or more cache memories, one or more registers, or other similar data stores disclosed herein.

Each computing object 1410, 1412, etc. and computing objects or devices 1420, 1422, 1424, 1426, 1428, etc. can communicate with one or more other computing objects 1410, 1412, etc. and computing objects or devices 1420, 1422, 1424, 1426, 1428, etc. by way of the communications network 1442, either directly or indirectly. Even though illustrated as a single element in FIG. 14, communications network 1442 may comprise other computing objects and computing devices that provide services to the system of FIG. 14, and/or may represent multiple interconnected networks, which are not shown. Each computing object 1410, 1412, etc. or computing object or devices 1420, 1422, 1424, 1426, 1428, etc. can also contain an application, such as applications 1430, 1432, 1434, 1436, 1438, that might make use of an API, or other object, software, firmware and/or hardware, suitable for communication with or implementation of the techniques and disclosure described herein.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems automatic diagnostic data collection as described in various embodiments herein.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service, in some cases without having to "know" any working details about the other program or the service itself.

In a client/server architecture, particularly a networked system, a client is usually a computer that accesses shared network resources provided by another computer, e.g., a server. In the illustration of FIG. 14, as a non-limiting example, computing objects or devices 1420, 1422, 1424, 1426, 1428, etc. can be thought of as clients and computing objects 1410, 1412, etc. can be thought of as servers where computing objects 1410, 1412, etc., acting as servers provide data services, such as receiving data from client computing objects or devices 1420, 1422, 1424, 1426, 1428, etc., storing of data, processing of data, transmitting data to client computing objects or devices 1420, 1422, 1424, 1426, 1428, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1442 or bus is the Internet, for example, the computing objects 1410, 1412, etc. can be Web servers with which other computing objects or devices 1420, 1422, 1424, 1426, 1428, etc. communicate via any of a number of known protocols, such as the hypertext transfer protocol (HTTP). Computing objects 1410, 1412, etc. acting as servers may also serve as clients, e.g., computing objects or devices 1420, 1422, 1424, 1426, 1428, etc., as may be characteristic of a distributed computing environment.

Reference throughout this specification to "one embodiment," "an embodiment," "an example", "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one example," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "architecture," "engine" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. A system, comprising:
   at least one processing component that comprises a cache controller, the cache controller being configured for managing a cache memory associated with a processor; and
   a centralized controller configured for storing a power state of the processor, storing one or more other power states associated with one or more other processors, and communicating with the cache controller based on the power state of the processor.

2. The system of claim 1, wherein the centralized controller is configured for filtering communication with the cache controller based on the power state of the processor.

3. The system of claim 1, wherein the centralized controller is configured for sending a snoop message to the cache controller in response to a determination that the processor is in a powered-up state.

4. The system of claim 3, wherein the cache controller is configured for sending an acknowledgment message to the centralized controller in response to receiving the snoop message.

5. The system of claim 4, wherein the centralized controller is configured for entering a wait state for the acknowledgment message in response to sending the snoop message.

6. The system of claim 1, wherein the centralized controller is configured for not sending a snoop message to the cache controller in response to a determination that the processor is in a powered-down state.

7. The system of claim 6, wherein the centralized controller is configured for implying an acknowledgment message from the cache controller in response to the determination that the processor is in the powered-down state.

8. The system of claim 7, wherein the centralized controller is configured for receiving a powering-on message when the processor has returned to a powered-on state.

9. The system of claim 1, wherein the centralized controller is configured for determining the power state of the processor.

10. The system of claim 1, wherein the cache controller and the centralized controller are coupled to a bus.

11. The system of claim 1, wherein the centralized controller is configured for associating the at least one processing component with a unique power domain.

12. The system of claim 1, wherein the at least one processing component comprises the cache controller, the cache memory, and the processor.

13. The system of claim 1, wherein the centralized controller is configured for implementing a cache coherence protocol.

14. A method, comprising:
   determining a power state for a processor;
   storing the power state for the processor;
   storing one or more other power states associated with one or more other processors; and
   communicating with a controller associated with the processor based on the power state of the processor.

15. The method of claim 14, wherein the communicating comprises sending a snoop message to the controller in response to a determination that the processor is in a powered-up state.

16. The method of claim 15, wherein the communicating further comprises entering a wait state to wait for a response from the controller.

17. The method of claim 16, wherein the communicating further comprises receiving an acknowledgment message from the controller.

18. The method of claim 14, wherein the communicating comprises withholding from sending a snoop message to the controller and implying an acknowledgment message from the controller in response to a determination that the processor is in a powered-down state.

19. A system, comprising:
   means for determining a power state for a processor;
   means for storing the power state for the processor;
   means for storing one or more other power states associated with one or more other processors; and
   means for communicating with a controller associated with the processor based on the power state of the processor.

* * * * *